(12) United States Patent
Bradley

(10) Patent No.: US 8,163,325 B2
(45) Date of Patent: Apr. 24, 2012

(54) CHEESE HAVING REINTRODUCED FINE PARTICLES OF CHEESE

(75) Inventor: Robert L. Bradley, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 1619 days.

(21) Appl. No.: 11/071,511

(22) Filed: Mar. 3, 2005

(65) Prior Publication Data

US 2005/0147716 A1    Jul. 7, 2005

Related U.S. Application Data

(62) Division of application No. 10/074,870, filed on Feb. 13, 2002, now Pat. No. 6,884,453.

(51) Int. Cl.
 *A23C 19/00*  (2006.01)
(52) U.S. Cl. ........... 426/582; 426/36; 426/519; 426/522
(58) Field of Classification Search ............. 426/36, 426/41, 519, 522, 580, 582
 See application file for complete search history.

(56) References Cited

U.S. PATENT DOCUMENTS

| | | |
|---|---|---|
| 4,957,751 A | 9/1990 | Lehmann et al. |
| 5,783,237 A | 7/1998 | Sanderson et al. |
| 6,120,809 A | 9/2000 | Rhodes |

OTHER PUBLICATIONS

Frank Kosikowski, *Cheese and Fermented Milk Foods* 2$^{nd}$ Ed. 1977, Ann Arbor Michigan, Edwards Bros., Chapter 7 *Fundamentals of Cheesemaking and Curing7*, pp. 90-108.
Frank Kosikowski, *Cheese and Fermented Milk Foods*, 2$^{nd}$ Ed. 1977, Ann Arbor Michigan, Edwards Bros., Chapter 8 *Cottage Cheese*, pp. 109-129.
*The Process of Cheese Making*, http://mdmd.essortment.com/making cheese_rzgm.htm (2001).
University of Guelph, Chemistry and Physics, *Dairy Chemistry and Physics*, http://www.foodsci.uoguelph.ca/dairyedu/chem.html, pp. 1-16 (date unknown).
*Cheese: Development of Structure*, http://distans.livstek.lth.se:2080/microscopy/f-cheese.htm, pp. 1-9 (2000).

*Primary Examiner* — Leslie Wong
(74) *Attorney, Agent, or Firm* — Whyte Hirschboeck Dudek S.C.

(57) ABSTRACT

Methods of making acid and rennet-based cheeses include processing a previous lot of milk to produce curds and whey from the previous lot of milk, and removing the whey from the curd. For cottage cheeses, curds are washed with a wash water. Whey and wash water (when used) include fine particles of curd, which are collected, added, and mixed into a subsequent lot of milk preferably using a mixer such as a homogenizer or colloid mill. Mixing preferably reduces the fine particle size of at least a plurality of the fine particles and increases the total amount of surface area thereof. Fine particles are reincorporated into the matrix of the curd made from the subsequent lot of milk, which increases curd yield. Also provided is a higher yield cheese that is made from a subsequent lot of milk that includes fine particles of curd from a previous lot of milk.

9 Claims, 9 Drawing Sheets

CHEESE HAVING REINTRODUCED FINE PARTICLES OF CHEESE

CROSS-REFERENCE TO RELATED APPLICATION

This application is a divisional of U.S. patent application Ser. No. 10/074,870, filed Feb. 13, 2002, now U.S. Pat. No. 6,884,453, which is incorporated herein by reference in its entirety.

FIELD OF THE INVENTION

The invention relates to methods of making cheese, and, in particular, methods of making cheese that have an increased yield of cheese curd.

DESCRIPTION OF THE RELATED ART

The main ingredient used in making cheese is milk. Ninety percent of milk produced in Wisconsin goes into the cheese-making process. There are two types of techniques for processing milk into curds and whey: acid precipitation and rennet precipitation. In acid precipitation, an acid-forming microorganism or an acid is added to the milk. For example, a specific bacteria that is capable of digesting lactose into lactic acid is added to the milk. As the pH of the milk reaches the isoelectric point of casein, the casein forms a continuous clot or curd. Acid-based cheeses include cottage cheese, cream cheese, and Ricotta cheese. In rennet precipitation, rennet is added to warm milk (at about 30-35° C.), causing the casein to form curd. Rennet-based cheeses include cheeses such as mozzarella, Cheddar, Swiss, and colby cheese.

Curd is fragile. It has long been known that handling it causes is to degrade into fine particles of curd, oftentimes referred to as "fines" or "cheese fines." Fine particles result from, e.g., cutting and stirring the curds. Additionally, pumping the curd to the drain table and draining the curd at the drain table also generates fine particles. Furthermore, when curds from, e.g., cottage cheese, are cooled and washed, fine particles flow away with cooling and wash water.

Generation of fine particles during a cheese-making process is known to be highly undesirable for several reasons. First, degradation causes a significant percentage of the curd to be lost. That is, fine particles do not contribute to cheese yield. Second, it has become environmentally unacceptable and even unlawful in some jurisdictions to discharge curd fines into the sewerage system. In jurisdictions that permit discharge of fine particles into the sewerage system, the high biological oxygen demand (BOD) of these particles and whey presents disposal problems. When whey that includes fine particles is discharged into a sewerage system, a BOD cost is added for its disposal. At least part of the BOD cost is assessed based on the amount of fine particles present in the whey. To reduce the disposal cost for the whey, many cheese makers remove fine particles from whey before it is discharged. Fine particles can be removed with a fine saver, such as a vibrating sieve. Fine particles are then disposed of separately.

Many cheese makers truck the whey, wash water, and fines into the country where it is distributed over large land areas at a high cost or fed to animals. Additionally, whey has such a high BOD that it can kill fresh water fish and the plants and other animals that live in the environment into which the whey is disposed. In sum, fine particles are costly to dispose of and contribute to pollution and environmental damage.

For every 100 pounds of milk processed into cheese, about 0.4 pounds of fine particles of cheese are generated. The United States produced 8.3 billion pounds of renneted cheese in the year 2000. Thus, cheese yields could have been significantly higher had fine particles not been lost. As noted above, the loss of fine particles reduces the amount of finished cheese available for sale and represents a loss in the overall yield in the cheese making process. In rennet-based cheeses, attempts have been made to put fine particles back into the cheese-making process. For example, some cheese makers put collected fines back onto the drain table on top of curd. However, the vast majority of fine particles are subsequently lost because the fine particles do not incorporate themselves into the matrix of the curd.

In view of the foregoing, it would be desirable to provide a method of recovering fine particles of cheese from a previous lot of milk and reincorporating the recovered fine particles into a subsequent cheese milk for increasing yield during the cheese making process. It would also be desirable to provide a cheese that includes fine particles recovered from a previous lot of cheese milk, thereby producing a cheese having a higher yield of curd.

SUMMARY OF THE INVENTION

The invention, which is defined by the claims set out at the end of this disclosure, is intended to solve at least some of the problems noted above. Methods of making two different classes of cheese are provided. The method begins by processing a previous lot of milk to produce cheese curds and whey. Whey is removed from the cheese curds. Whey includes fine particles of cheese curd. Additionally, wash water, which is used when making, e.g., cottage cheese, includes fine particles of cheese curd. Fine particles of cheese curd are collected from the whey and then added to a subsequent lot of milk. Where wash water is used, fine particles of cheese curd can also be collected therefrom. In a preferred embodiment, the fine particles from the previous lot of milk are mixed into the subsequent lot of milk. Mixing preferably includes at least partially solubilizing fine particles of cheese curd from the previous lot of milk into the subsequent lot of milk. It also preferably includes maintaining fine particles in solution by inhibiting or even preventing fine particles from settling out of the subsequent lot of milk.

In a preferred embodiment, a homogenizer or colloid mill is used to mix fine particles of cheese curd into the subsequent lot of milk. Homogenizers are standard equipment in dairy factories for making acid-based cheeses, such as cottage cheese. In another preferred embodiment, a colloid mill is used to mix fine particles of cheese curd into the subsequent lot of milk. Fine particles can be added to a portion or the entire lot of the subsequent milk. The method advantageously is versatile in that it can be used to make both acid-based cheeses and rennet-based cheeses.

Fine particles of cheese curd, having been reduced in size by homogenization or passing through a colloid mill, are reincorporated into the matrix of the cheese curd made from the subsequent lot of milk, thereby increasing the yield of cheese curd made from the subsequent lot of milk. In a preferred embodiment, virtually all fine particles recovered from a previous lot of milk are incorporated into cheese curd made from the subsequent lot of milk.

Also provided is a cheese that includes fine particles of cheese curd from a previous lot of milk and cheese curd that is processed from a subsequent lot of milk. Fine particles of cheese curd from the previous lot of milk are incorporated into the matrix of the cheese curd from the subsequent lot of milk. Acid-based cheeses and rennet-based cheeses having an increased yield of curd are provided.

In addition, a method of making a dressing is provided. The method includes processing a lot of milk to produce cheese curds and whey. The cheese curds are removed from the whey and wash water, which includes fine particles of cheese curd. The fine particles of cheese curd are then collected and added to a mixture including salt, cultured flavor, milk, and a stabilizer to form the dressing. Additionally, a dressing is provided that includes fine particles of cheese curd isolated from a previous lot of milk, salt, cultured flavor, cream, milk, and a stabilizer.

BRIEF DESCRIPTION OF THE DRAWINGS

Preferred exemplary embodiments of the invention are illustrated in the accompanying drawing, in which.

Figure 1A:
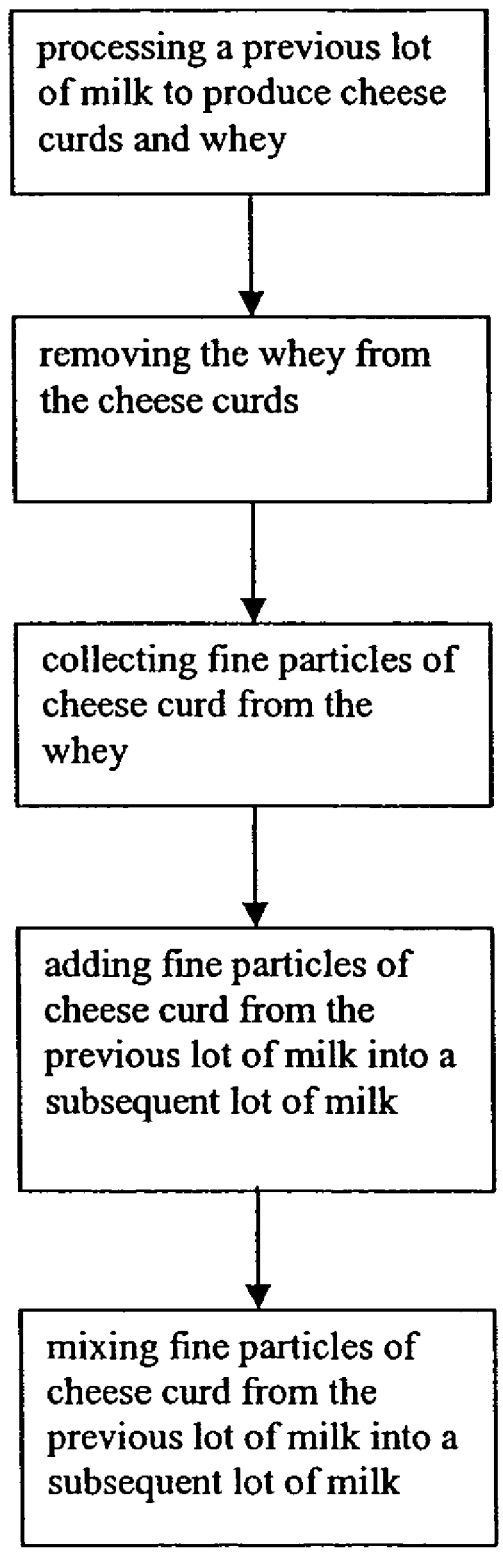
FIG. 1A is a flowchart showing steps for making rennet-based cheeses in a preferred embodiment of carrying out the invention.

Before explaining embodiments of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION

1. General Overview of the Invention

A method of making cheese that produces a higher yield than conventional methods is provided. Referring to FIG. 1A, which shows a preferred embodiment of the invention for rennet-based cheeses, a previous lot of milk is processed with rennet to produce cheese curd and whey. It should be noted that the term processed is interchangeably used herein with the terms clotted, coagulated, and curdled. The whey is removed from the cheese curd. The whey contains fine particles of cheese curd. Fine particles are collected from the whey. Collected fine particles are added to a subsequent lot of milk. The invention provides several options for where the fine particles can be added during the cheese-making process. Representative options are discussed in detail below.

As used herein, the terms previous and subsequent refer both to continuous flow processes and batch processes. Additionally, the term lot refers to both to continuous flow processes and batch processes.

Further processing of the rennet curd after the removal of the whey typically includes adding cheese salt to control acid development. However, some cheese is salt brined following the molding or following a hooping. Once the cheese has been salted and molded, it is allowed to ripen. This can take anywhere from two weeks to several months or even longer, depending upon the type of cheese being made. During the curing process, bacteria digest, e.g., the casein, fats, and lactose. The variety of cheese produced will depend on the types of bacteria, the curing times, and the temperature and humidity of the storeroom.

Fine particles collected from the whey from the previous lot of milk are mixed in the subsequent lot of milk. The subsequent lot of milk is processed into cheese. The mixing permits fine particles from a previous lot of milk to be incorporated into the matrix of the curd formed from the subsequent milk lot. Mixing preferably is performed without requiring demineralization, namely decalcification, of the fine particles. A significantly higher yield of cheese results from the subsequent lot of milk due to the presence of fine particles from the previous lot of milk.

The fine particles are mixed into the subsequent lot of milk preferably using a mixer, such as a homogenizer, a colloid mill, or the like. The mixer is set at an appropriate setting such that passage of the fine particles through the mixer causes at least one of the following effects: reduction in particle size of at least a plurality of the particles, increase in surface area allowing for increased solubilization, reduction of the effect of gravity on the particles because now they have reduced size, maintenance of fine particles in solution by inhibiting or preventing them from settling out from the cheese milk, and at least partially dissolving protein and trapped minerals in fine particles. Where the homogenizer is of two-stage construction, the homogenizer preferably operates at a setting of between about 500 and about 3500 psi, and more preferably at about 2000 psi. When using a colloid mill, it is preferably operated at a setting such that is has a clearance of about 0.01 inches to about 0.04 inches, and more preferably about 0.01 inches. Additionally, the inherent pH of the milk buffers the acidity of fine particles and at least partially solubilizes fine particles in the milk.

Figure 1B:
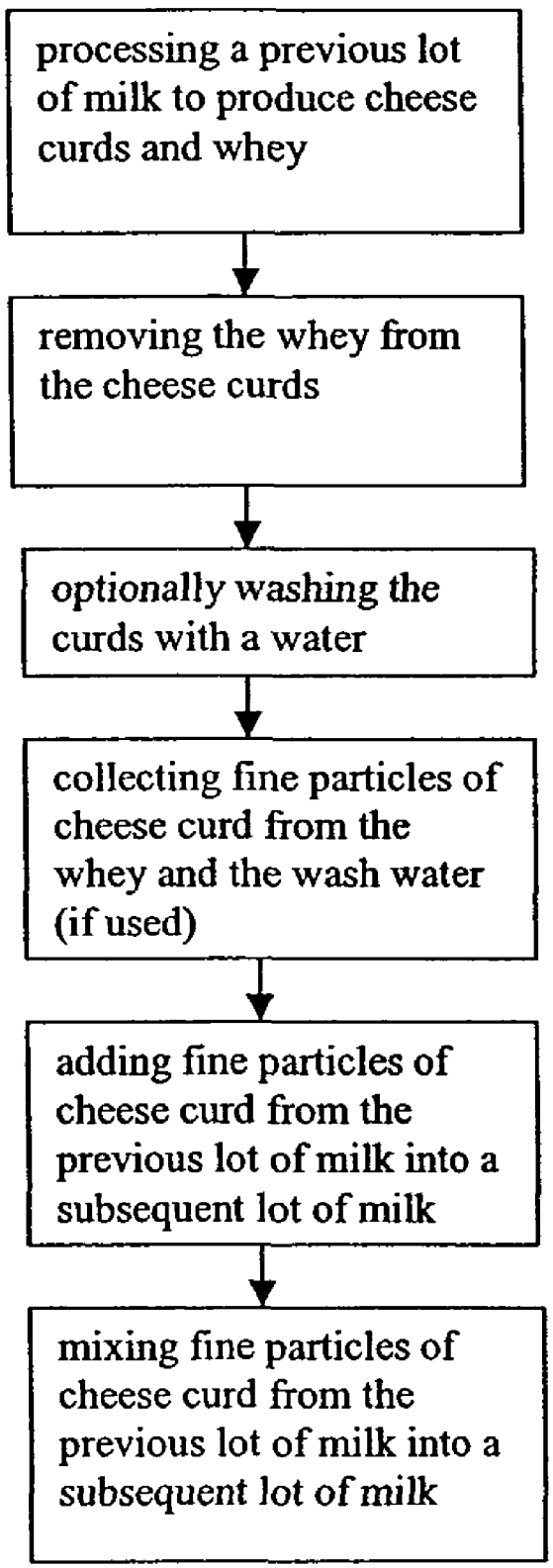
FIG. 1B is a flowchart showing steps for making acid-based cheeses in a preferred embodiment of carrying out the invention.

FIG. 1B shows a preferred embodiment of the invention for acid-based cheeses in which milk is processed with an acid to produce curds and whey. For acid-based cheeses, milk typically is acidified either by direct addition of an acid or by adding a bacterial inoculum, such as *Lactococcus lactis* ssp *lactis* or *Lactococcus lactis* ssp *cremoris*, which produces lactic acid via lactose digestion. The pH of the milk decreases until it reaches the isoelectric point of casein, typically a pH of 4.6, causing a clot to occur.

FIG. 1B varies from FIG. 1A in that optional steps of washing the curds with a wash water and collecting fine particles from the wash water are included. This washing step is typically used when making cottage cheese. Where washing is performed, the curd is usually washed multiple times, typically three times, with cold water to further remove residual whey and reduce the curd temperature. Wash water also contains fine particles of cheese curd. Where curds are washed in any of the following methods, it is to be understood that fine particles can be collected from the wash water and be used in a subsequent lot of milk.

Several preferred equipment arrangements and preferred methods for carrying out the invention will now be described in detail.

2. Fine Particles from Acid-Based Cheese Reintroduced at Balance Tank

Figure 2A:
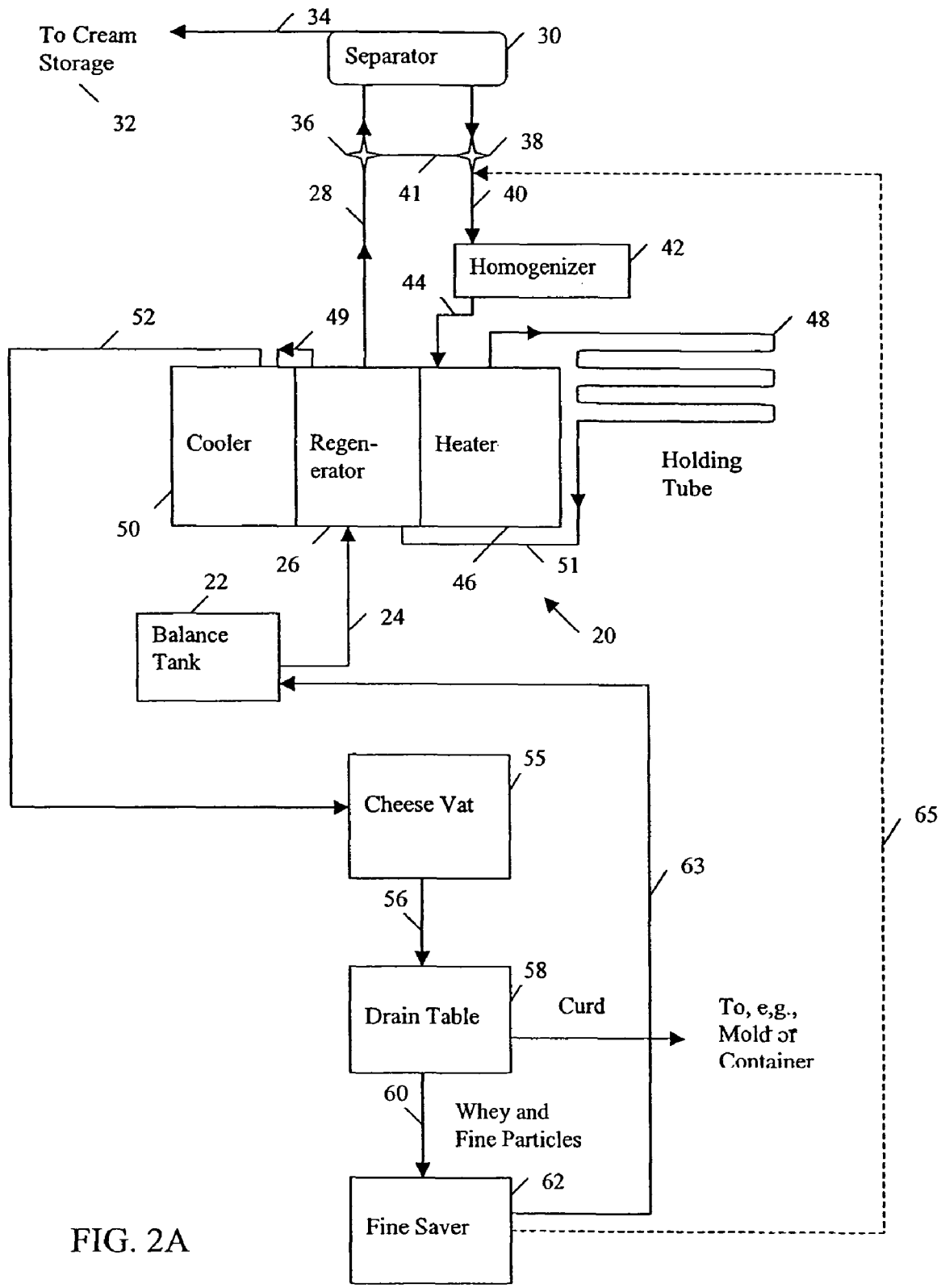
FIG. 2A is a schematic of a portion of the equipment for practicing at least one preferred embodiment of the invention.
Figure 3:
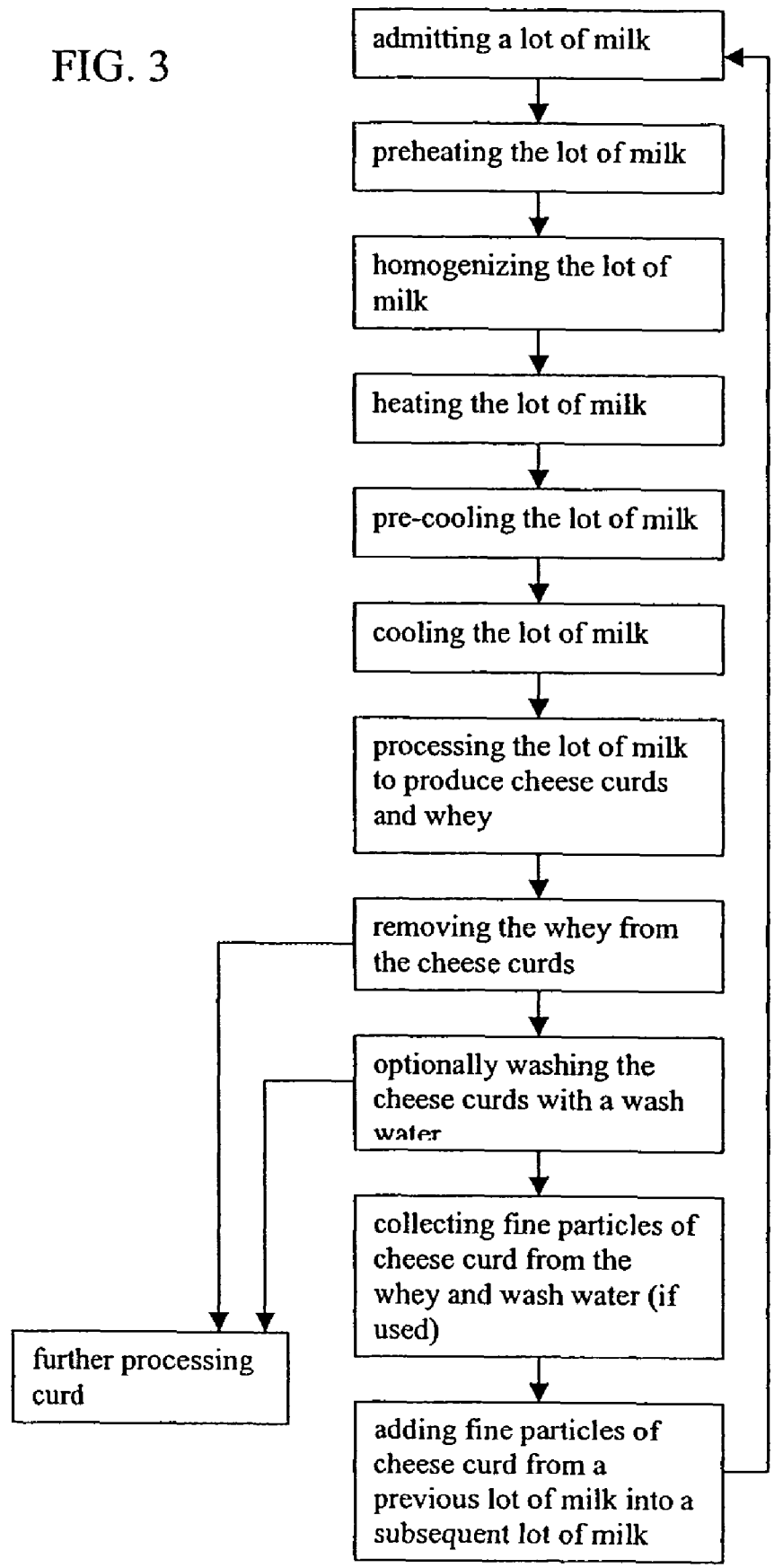
FIG. 3 is a flowchart showing steps in a first preferred method of carrying out the invention.

Attention is now directed to FIGS. 2A and 3. FIG. 2A shows a preferred equipment arrangement for making acid-based cheese with the invention. FIG. 3 illustrates steps for performing a first preferred method. Cheese milk, i.e., the milk from which cheese is made, is admitted to a pasteurization system 20 from a balance tank 22. The milk is transferred from the balance tank 22 through a conduit 24 to a regenerator 26 of the pasteurization system 20. Milk typically enters the regenerator at about 40° F. (40° C.). Initially, milk is preheated in the regenerator 26. The regenerator 26, which basically is a heat exchanger, permits incoming milk, which typically is raw or unpasteurized, to scavenge excess heat from outgoing, heat-treated milk and thereby provides preheating for the incoming milk and pre-cooling to the outgoing milk. Milk typically exits the regenerator 26 at about 150° F. (66° C.).

Milk exits the regenerator 26 through a conduit 28 and can enter a separator 30, which separates cream from the milk and transports the cream to a cream storage 32 via a cream line 34. The separator 30 typically includes a bowl (not shown) that contains conical plates (not shown) that are stacked about an inner perimeter (not shown) of the bowl of the separator 30. The separator bowl (not shown) rotates on a spindle (not shown) at about 6,000 rpm or at a speed that produces an equivalent G force. At this speed, all dense, fine material is displaced toward an outer perimeter of the bowl. Fine particles that are present in milk collect at an outer perimeter of the bowl. When this happens, it can be impractical, if not impossible, to salvage fine particles and reincorporate them into a subsequent milk lot. To avoid this, the separator 30 can be bypassed when admitted cheese milk is already at a desired fat content. For example, when making cottage cheese, the separator can be bypassed if the admitted cheese milk is already at a desired fat content, such as separated to less than 0.1% fat. By-pass valves 36, 38 may be provided in conduits 28, 40 leading to and from the separator 30 in order to permit valving out, i.e., bypassing, the separator 30 via conduit 41.

A homogenizer 42, which renders milk more homogenous, is located downstream from the separator 30. Milk flowing out of the homogenizer 42 travels via conduit 44 to a heater 46. The milk is heated to a pasteurization temperature of around 163° F. (73° C.) by the heater 46, typically using heat from a steam-energized hot water supply. After being heated in the heater 46, the milk is passed to a holding tube 48, where the milk is retained at an elevated temperature for a predetermined time to reduce the amount of bacteria present in the milk.

The pasteurized milk then returns via conduit 51 to the regenerator 26 where it transfers heat to the incoming milk of a subsequent lot, causing its own temperature to drop. After passing through the regenerator 26, the pasteurized milk flows through conduit 49 to a cooler 50 to further lower its temperature, typically to about 35° F. (about 1-2° C.).

After chilling, the pasteurized milk is transferred through conduit 52 to a cheese vat 55, where, for acid-based cheeses, the milk is processed into curds and whey with an acid. The curd is then cut into cubes of a predetermined size, depending on the style of cheese being made. For example, when making cottage cheese, the curd is cut into cubes having a specific size, depending upon whether small curd or large curd cottage cheese is being made.

The cubes of curd are allowed to settle and heal for a period of time. The curd is then agitated and cooked very slowly, e.g., to a temperature of about 130° F. (54° C.) for cottage cheese. The agitation and cooking expels whey from the curd. The curd is moved, e.g., with a pump (not shown) through conduit 56 to a drain table 58, where the whey is removed from the curd during draining. Whey removed from the curd contains fine particles of curd. If desired, curds can be washed with a wash water.

The whey is transferred, such as through a conduit 60, to a fine saver 62, which preferably is a vibrating sieve, to collect fine particles of curd. A preferred fine saver 62 is a Sweeco Vibrating Screen, which is available from Sweeco, Inc. of Florence, Ky. Other devices, such as a rotating belt for separating fine particles or a revolving drum or other device, can also be used to separate fine particles of cheese curd from whey.

Where washing is performed, fine particles can also be collected from the wash water. The wash water is transferred to the fine saver 62, where fine particles are collected. These fine particles can also be used in a subsequent lot of milk.

For acid curd, such as cottage cheese and similar cheeses, further processing of the curd typically includes adding a cream dressing to the curd and blending by gentle stirring. The dressing includes, for example, about two-thirds of the finished cottage cheese and contains salt, cultured flavor, enough milk and cream to satisfy label needs, and a stablizer. Containers are then filled, sealed, and followed by refrigeration.

Full fat, low fat, and no fat cottage cheese dressings typically require the addition of non-fat dry milk solids during manufacture. For this, fines collected from whey from previous lots of milk are used to build needed solids in cottage cheese dressings. Such dressings preferably are pasteurized and homogenized, and thus, meet the pasteurization process as outlined in FIGS. 2A and 2B.

In this preferred embodiment, fine particles of cheese curd recovered from this previous lot of milk are added into a subsequent lot of cheese milk at or near the balance tank 22 (as indicated by conduit 63 in FIG. 2A). The subsequent lot of milk, including recovered fine particles from the previous lot of milk, moves from the balance tank 22 to the regenerator 26 via conduit 24. From the regenerator 26, the subsequent lot of milk, including the recovered fine particles, preferably is diverted around the separator 30. The diversion is preferably accomplished by closing the valves 36 and 38 to divert the subsequent lot of milk, including the recovered fine particles, through conduits 28, 41, and 40, thereby bypassing the separator 30. This avoids the aforementioned problem related to fine particles separating out of solution onto the outer perimeter of the bowl of the separator 30. With the separator 30 valve out, the subsequent lot of milk and the fine particles travel from the regenerator 26 to the homogenizer 42.

At the homogenizer 42, the recovered fine particles are mixed into the subsequent lot of milk. Preferably, the homogenized milk and recovered fine particles mixture then travels through conduit 44 to the heater 46, where the mixture is then subsequently pasteurized in the holding tube 48. Thus, fine particles are pasteurized an additional time. The mixture then continues through the cheese making equipment described above.

This preferred embodiment, in which the milk is diverted around the separator, is particularly useful when the cheese milk entering from the balance tank 22 already has the needed amount of fat. In this case, no separation of the cream from the milk is necessary. For example, this is particularly useful when making skim milk cheese and skim milk is in the balance tank.

Figure 4:
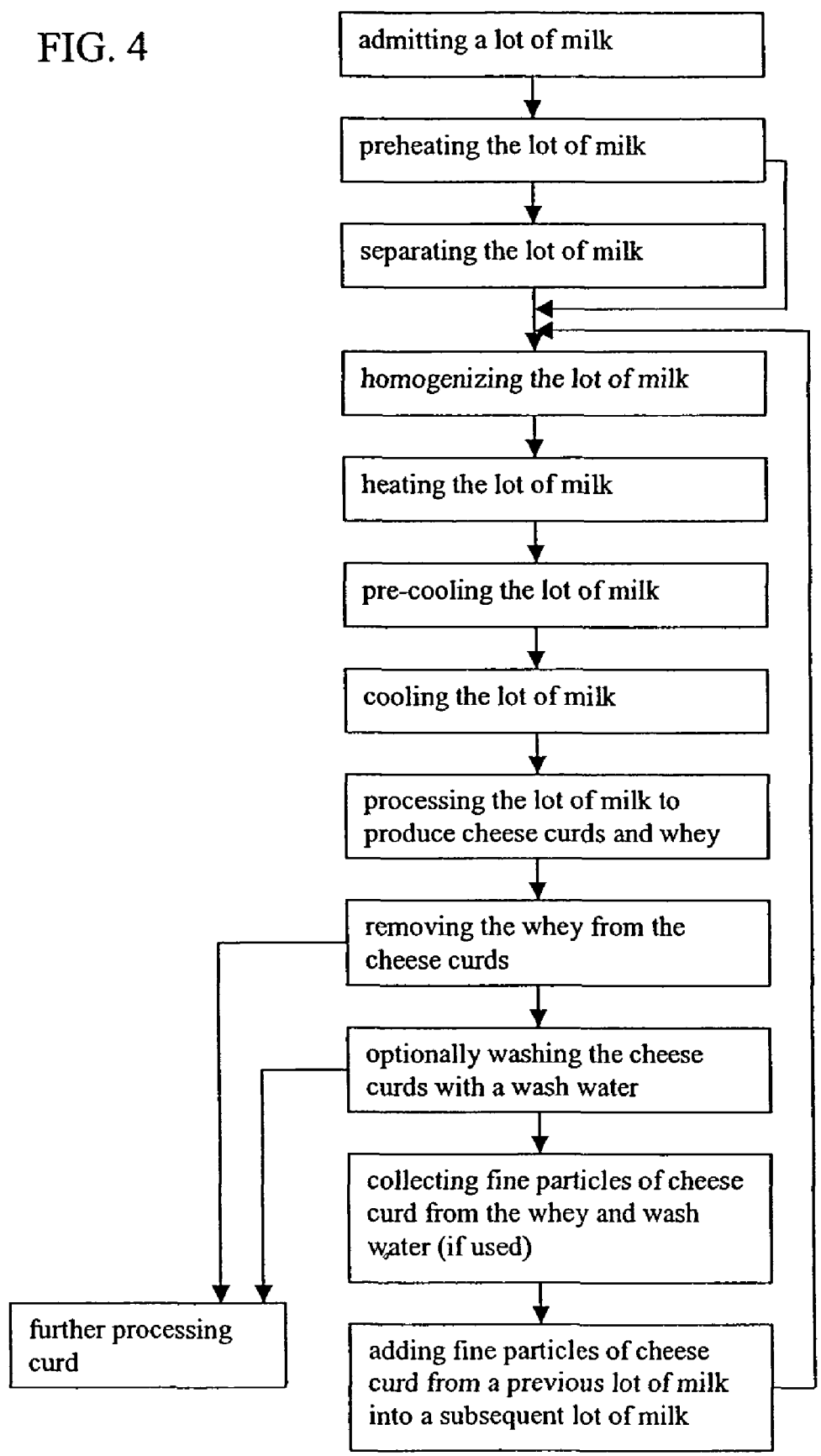
FIG. 4 is a flowchart showing steps in a second preferred method of carrying out the invention.

3. Fine Particles from Acid-Based Cheese Reintroduced Prior to Homogenization Still referring to FIG. 2A and now also referring now to FIG. 4, in a second preferred method, which is particularly useful for making acid-based cheeses, such as cottage cheeses, fine particles from the whey of a previous lot of milk are added into a subsequent lot of milk cheese at conduit 40 (as indicated by conduit 65 shown in phantom in FIG. 2A), after the milk passes through the separator 30 and before the milk enters the homogenizer 42. At the homogenizer 42, fine particles are mixed into the subsequent lot of milk, as in the first preferred method. Adding recovered fine particles after the milk passes through the separator 30 avoids the aforementioned problem of generating unsalvageable fine particles inside of the separator 30. Additionally, as in the first preferred method, additional pasteurization of recovered fine particles occurs. One of the benefits of the second preferred method is that the cheese milk can be of a different fat level than the cheese that is produced therefrom. For example, using this preferred embodiment, high fat milk enters the separator 30, where the cream is removed to produce lower or nonfat milk. Fine particles are added to the reduced fat milk downstream of the separator 30 at, e.g., conduit 40. Preferably, fine particles are added into the subsequent lot of milk at or upstream of the homogenizer 42 after the fat content of the milk is lowered in the separator 30. Thus, a cheese can be produced that has a lower fat content than would be made if the milk had not been separated and had full fat content.

4. Fine Particles from Acid-Based Cheese Reintroduced After the Pasteurizer

Figure 2B:
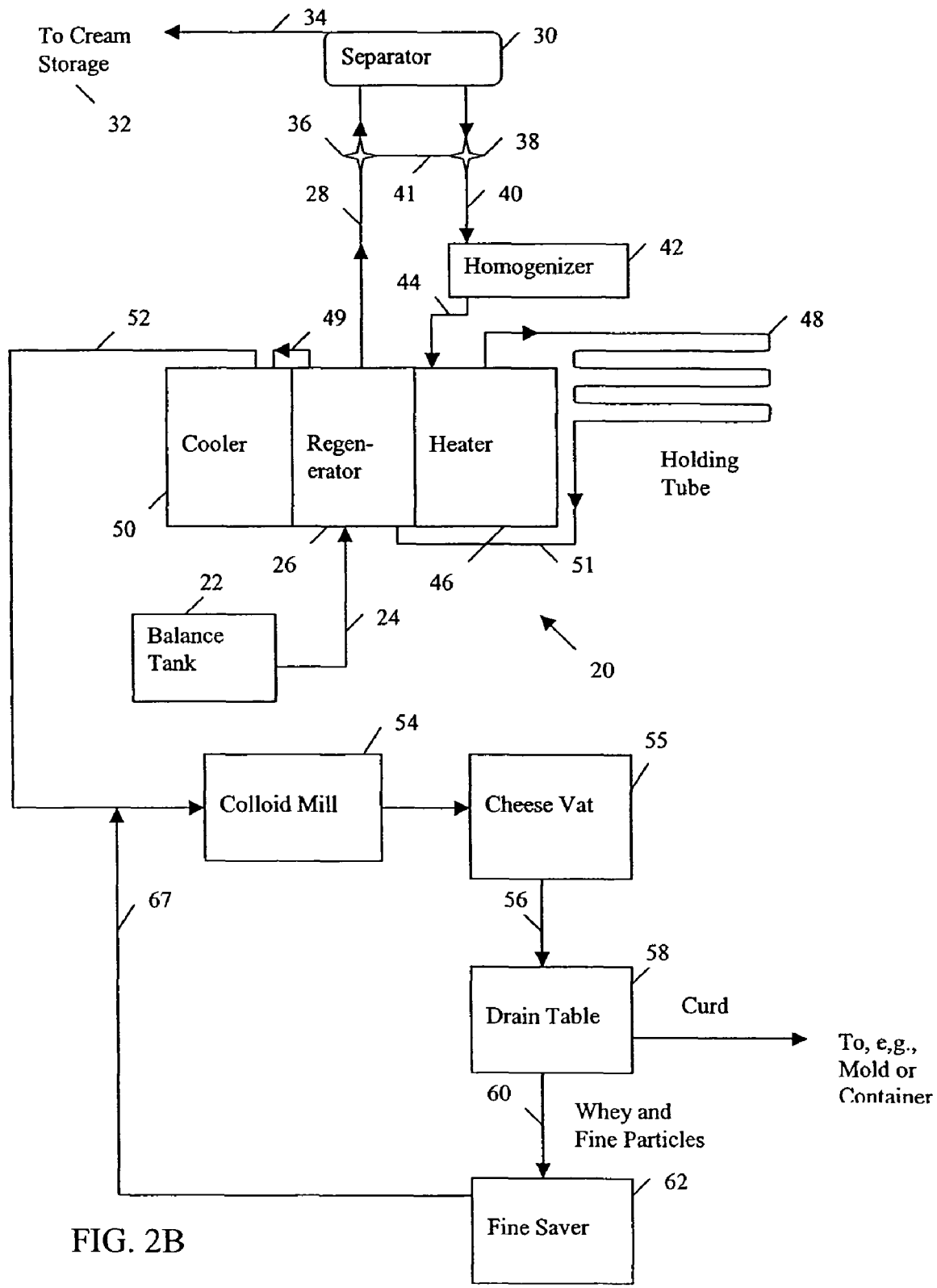
FIG. 2B is a schematic of a portion of the equipment for practicing at least one other preferred embodiment of the invention.
Figure 5:
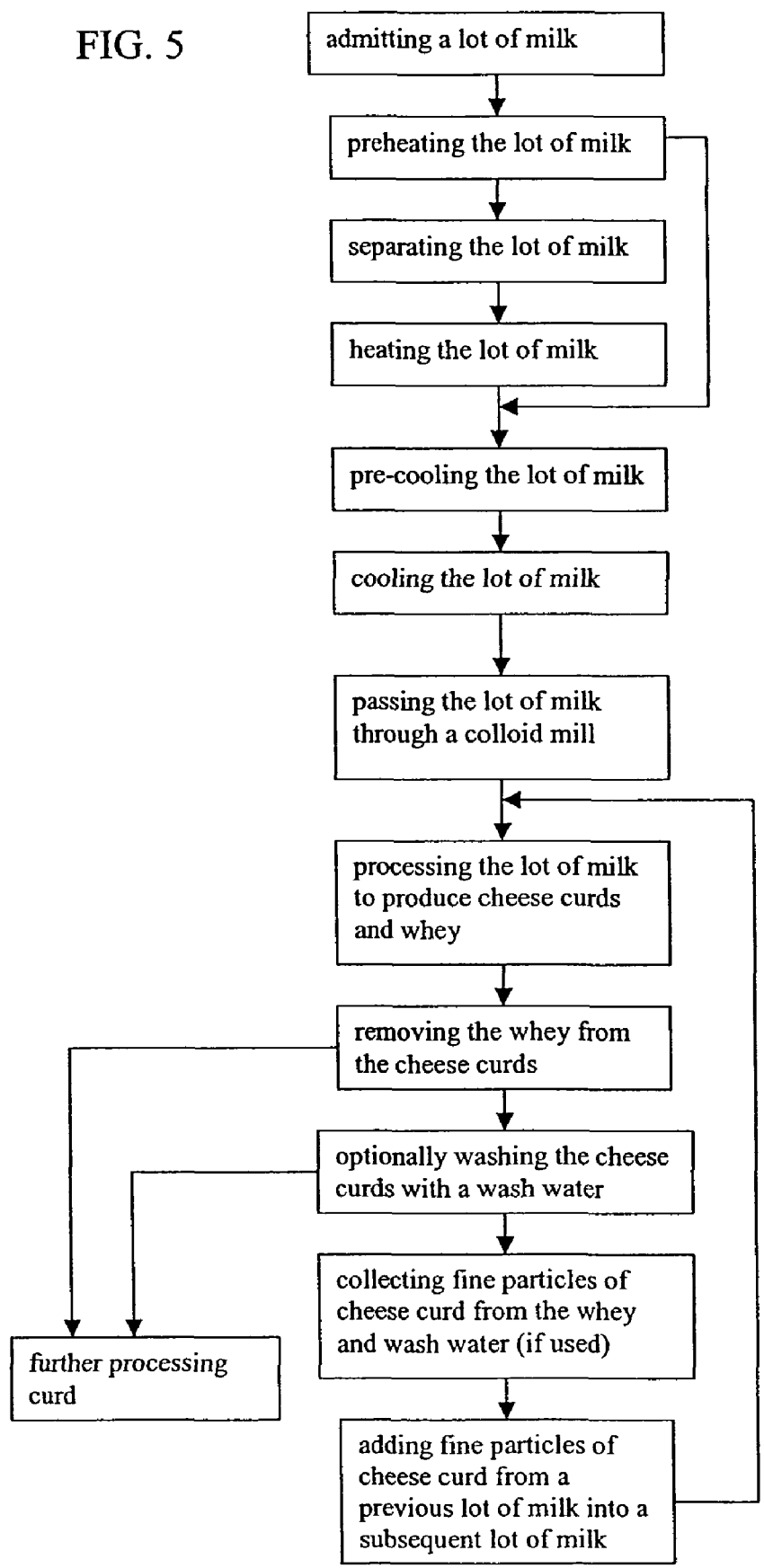
FIG. 5 is a flowchart showing steps in a third preferred method of carrying out the invention.

Attention is now directed to FIGS. 2B and 5, which shows steps for a third preferred method, which is particularly useful for making acid-based cheeses. FIG. 2B shows a preferred equipment arrangement that is similar to that shown in FIG. 2A except for the inclusion of a colloid mill 54, which is located upstream of the cheese vat 55. In the preferred equipment arrangement shown in FIG. 2B, the colloid mill 54 is located upstream of the cheese vat 55 and downstream of the cooler 50. A colloid mill 54 provides flexibility in that it can be added to the cheese-making equipment at a variety of places, with the conduit 52 being a preferred location. The colloid mill 54 is used to mix the fine particles and the subsequent lot of milk.

Figure 6:
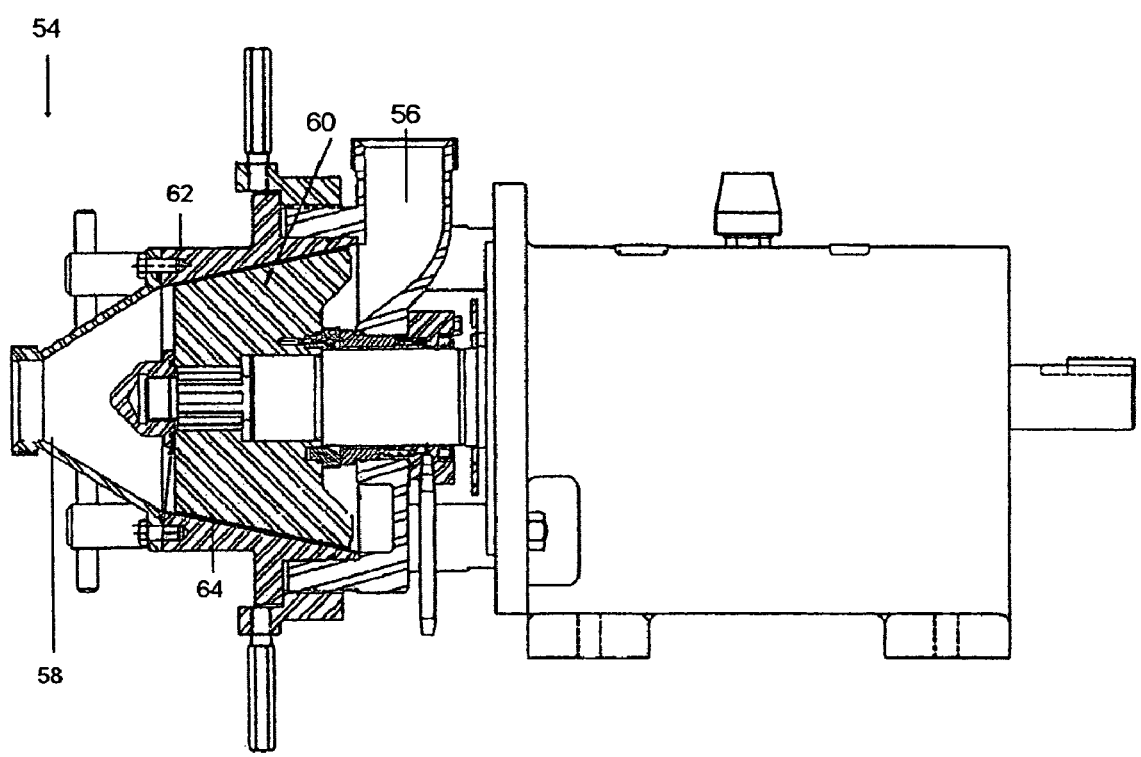
FIG. 6 is a cross-sectional view of a colloid mill used in some of the preferred equipment arrangements.

Referring to FIG. 6, a typical colloid mill 54 includes an inlet 56 and an outlet 58, and a high-velocity rotating inner drum 60 and a static outer drum 62. A passageway 64 between the inner and outer drums 60, 62 preferably is adjusted to 0.01 inch wide. On their opposing surfaces, the inner and outer drums 60, 62 include longitudinally extending grooves (not shown). The grooves are on the order of $\frac{1}{16}^{th}$ of an inch deep, and preferably each have a sidewall that is disposed at an angle of 90° relative to the passageway 64 between the drums 60, 62. The angled sidewalls provide a shearing edge that reduces the size of the fine particles moving through the colloid mill 54.

Preferably, the milk and fine particles enters the colloid mill 54 at the inlet 56 and moves into the passageway 64 between the revolving and static drums 60, 62, respectively. During operation, relative rotation between the inner drum 60 and the outer drum 62 shears fine particles passing through the passageway 64. This advantageously makes them smaller, which, in turn, makes it easier for them to more fully solubilize. Apart from solubilization, smaller fine particles are easier to maintain in suspension and are therefore more easily incorporated into the matrix of the cheese curd. The milk and recovered fine particles exits the colloid mill 54 via the outlet 58.

In this preferred method, recovered fine particles from a previous lot of milk are added into a subsequent lot of milk cheese at conduit 52 (as indicated by conduit 67 in FIG. 2B), downstream from the cooler 50 and upstream from the colloid mill 54, where the fine particles and milk are mixed. In this preferred embodiment, unless fine particles from the previous lot of milk are re-pasteurized separately from the subsequent lot of milk, no re-pasteurization of fine particles occurs. In this preferred embodiment, the separator 30 may or may not be bypassed, depending on whether a reduction in the fat content of the cheese milk is desired.

5. Fine Particles from Rennet-Based Cheese Reintroduced at Balance Tank

Figure 2C:
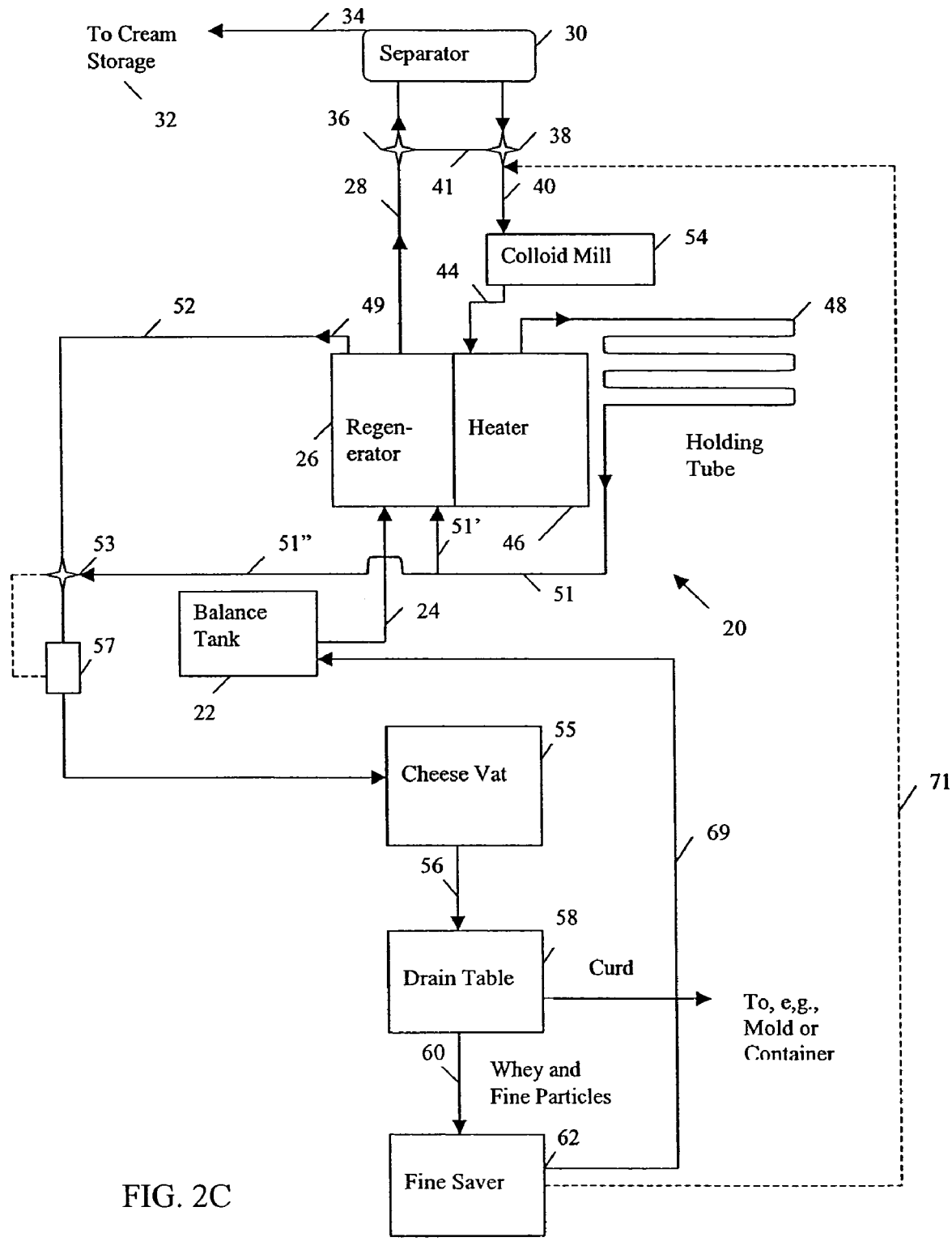
FIG. 2C is a schematic of a portion of the equipment for practicing another preferred embodiment of the invention.

Referring to FIG. 2C, in a fourth preferred embodiment, which is particularly useful for rennet-based cheeses, fine particles from the whey from a previous lot of milk are added to a subsequent lot of milk cheese via conduit 40 (indicated by conduit 69 in FIG. 2C) at the balance tank 22.

The equipment arrangement of FIG. 2C replaces the homogenizer 42 with a colloid mill 54. This equipment arrangement, i.e., the inclusion of a colloid mill 54, can be used when the cheese making facility lacks a homogenizer, such as is typically the case for a cheese-making facility where only rennet-based cheeses are made. Although FIG. 2C shows the colloid mill 54 being located downstream of the fine saver 62 and the separator 30 and upstream of the heater 46, the colloid mill 54 can be placed at other locations if desired. A colloid mill 54 can also be used to mix the fine particles where it is impractical to use a homogenizer 54 to add cheese fines as feedstock to the homogenizer. Where it is desired also to use a homogenizer and colloid mill together, the colloid mill 54 can be located upstream of the homogenizer.

Also of note is that the arrangement of equipment of the FIG. 2C omits a cooler. Hence, cheese milk may go directly from the regenerator 26 to the cheese vat 55 via conduit 49, which is continuous with conduit 52. In this arrangement, conduit 51, which leads from the holding tube 48, branches into two separate conduits 51' and 51", with one of the conduits 51' being connected to the regenerator 26 and the other one of the conduits 51" being connected to conduit 52 by a temperature controlled valve 53. In this instance, milk exiting the regenerator 26 may be blended with milk from conduit 51" at the valve 53. The addition of milk from the holding tube 48, and the absence of running the milk through a cooler, permits milk to be directed to the cheese vat 55 at a higher temperature of, for example, 72° F. (22° C.), which is measured at a temperature sensor 57. As with acid-based curd, rennet curd is drained at the drain table 58 after the milk is processed with rennet at the cheese vat.

6. Fine Particles from Rennet-Based Cheese Reintroduced Prior to Colloid Mill Still referring to FIG. 2C, in a fifth preferred method, which is particularly useful for rennet-based cheeses, fine particles from the whey from a previous lot of milk are added to a subsequent lot of milk cheese at conduit 40 (indicated by conduit 71 shown in phantom in FIG. 2C) upstream of the colloid mill 54.

In this preferred method, unless fine particles from the previous lot of milk are re-pasteurized separately from the subsequent lot of milk, no re-pasteurization of fine particles occurs. In this preferred method, if desired, the cheese milk can be run through the separator 30 because fine particles are added subsequent to the milk being separated in the separator 30 and with the colloid mill 54 inline or feeding into conduit

40 from a blending tank (not shown) containing milk of the correct fat content and fine particles from the previous lot of milk.

7. Conclusion

Using a method described herein, fine particles, which traditionally were considered a waste product, are recovered and added back into the cheese making process. When making any type of cheese using any preferred method described herein, virtually all of the fine particles that are collected from a previous lot of milk cheese preferably can be added and mixed into a subsequent lot of milk. About 0.4 pounds of fine particles are generated for each 100 pounds of milk processed. Thus, from 25,000 pounds of milk, 100 pounds of fine particles are produced. Using a method described herein, for 25,000 pounds of cheese milk, 100 pounds of fine particles can be recovered. The recovered 100 pounds of fine particles can be added and mixed into a subsequent 25,000 pound lot of cheese milk. While the subsequent 25,000 pounds of milk will again produce and lose 100 pounds of fine particles, there is virtually a zero loss of fine particles for each subsequent lot of cheese milk, because 100 pounds of fine particles from the previous lot of milk were added to the subsequent lot of milk. Furthermore, even if fine particles are lost an additional time, they will be recovered again when the next lot of milk is processed.

Adding and mixing fine particles of curd collected from a previous lot of cheese milk into a subsequent lot of cheese milk increases the yield of cheese produced. Using a method described herein, fine particles from a previous lot of cheese milk are reincorporated into the matrix of the curd made from a subsequent lot of milk. This results in virtually all recovered fine particles contributing to the increase in curd yield from a subsequent lot of milk. For example, using traditional methods, the yield of curd is approximately 14 pounds of cottage cheese curd for 100 pounds of fluid skim milk. Recovering and reincorporating fine particles into a subsequent lot of cheese milk increases the yield of curd between by at least 2%, and preferably between about 2.5% and about 3.0%.

Using a method described herein to recover and use fine particles represents a financial savings for cheese makers. For every 25,000 pounds of milk, which generates 100 pounds of fine particles, using the current cost for cottage cheese fine particles ($1.00 per pound), a method described herein would currently produce a savings of $100 for every 25,000 pounds of cheese milk that is processed into cottage cheese. For Cheddar cheese, the per-pound price of fine particles is higher ($1.60/pound) than for cottage cheese. A savings of $160 is realized for every 25,000 pounds of milk that is processed into Cheddar cheese.

In the United States in 1999, 722 million pounds of cottage cheese and 2,816,867,000 pounds of Cheddar cheese were produced. Using a method described herein, an additional 2.9 million pounds higher yield of cottage cheese and an additional 11.3 million pounds higher yield of Cheddar cheese would have resulted. Thus, for cottage cheese alone, recovering and reincorporating fine particles back into the cheese curd would result in a $2.9 million value based on the 1999 data. For Cheddar cheese alone, based on the 1999 data, recovering and reincorporating fine particles back into the cheese curd would produce a $18.1 million value.

Additionally, using a method described herein, disposal costs for fine particles are dramatically reduced or even eliminated. Thus, pollution caused by fine particles is reduced or even eliminated. The costs associated with disposing of fine particles is also dramatically reduced or even eliminated. The disposal cost of whey and/or fine particles themselves is also reduced because whey produced in the inventive method, which has had fine particles removed, is a lower-BOD effluent. Thus, the biological oxygen demand cost is reduced.

Furthermore, the method described herein is cost effective in terms of equipment necessary to practice the invention. The preferred equipment arrangements that use a homogenizer can be practiced using standard equipment already available in cheese plants that make, e.g., acid-based cheeses. The preferred embodiments that use a colloid mill can be practiced with relatively little financial investment: currently around $16,000 for a colloid mill. Additionally, fine savers are standard equipment in virtually all cheese plants.

Preferably, recovered fine particles are added into the next lot of milk, with recovered fine particles remaining out of the cheese-making process as little time as possible. This minimizes bacteriological problems associated with holding fines at a temperature at which undesired microorganisms can grow. If the addition of fine particles is delayed, fine particles can be refrigerated preferably at less than 45° F. (7° C.) until they are used. Additionally, it is preferred to use fine particles when they are as fresh as possible because continued development of acidity in fine particles does not enhance their reincorporation into a subsequent lot of milk cheese. Most cheese plants run 24 hours a day, 6-7 days a week. Thus, using a method described herein, except for the last lot of cheese milk run through a plant, virtually no measurable loss of fine particles occurs during the cheese-making process.

Cottage cheese made with the method described herein was evaluated and taste tested and was advantageously found to be organoleptically indistinguishable from cottage cheese made with traditional methods. Thus, the quality of cottage cheese made with the inventive method was not altered.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention. The invention is not intended to be limited to the preferred embodiments described above, but rather is intended to be limited only by the claims set out below. Thus, the invention encompasses all alternate embodiments that fall literally or equivalently within the scope of these claims.

What is claimed is:

1. A cheese, comprising:
   (a) fine particles of acid cheese curd collected from a wash water used to wash acid cheese curd from a previous lot of milk; and
   (b) acid cheese curd that is processed from a subsequent lot of milk.

2. A cheese of claim 1, wherein the fine particles of acid cheese curd are not demineralized.

3. A cheese, comprising:
   (a) fine particles of cheese curd collected from cheese curd made from a previous lot of milk, wherein the fine particles of cheese curd are not demineralized; and
   (b) cheese curd that is processed from a subsequent lot of milk.

4. A cheese of claim 3, wherein the fine particles of cheese curd arc not decalcified.

5. A cheese, comprising:
   (a) fine particles of cheese curd collected from cheese curd made from a previous lot of milk, wherein the collected fine particles of cheese curd are integrated into a subsequent lot of milk and have a total surface area that is increased when compared to fine particles of cheese curd that have not been integrated into the subsequent lot of milk; and (b) cheese curd that is processed from the subsequent lot of milk.

6. A cheese of claim 5, wherein the fine particles of cheese curd are at least partially solubilized into the subsequent lot of milk.

7. A cheese of claim 5, wherein the cheese curd is processed from acidified milk.

8. A cheese of claim 5, wherein the cheese curd is procesed from rennet-treated milk.

9. A cheese of claim 5, wherein the cheese is selected from the group consisting of Cheddar, mozzarella, Swiss, and colby cheeses.

* * * * *